(12) United States Patent
Kanesaka

(10) Patent No.: US 6,972,880 B1
(45) Date of Patent: Dec. 6, 2005

(54) OPTICAL RECEIVING UNIT HAVING FREQUENCY CHARACTERISTICS WHICH ARE CONTROLLABLE IN ACCORDANCE WITH A CLOCK SIGNAL USED TO TRANSMIT DATA

(75) Inventor: Hiroki Kanesaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 655 days.

(21) Appl. No.: 08/730,396

(22) Filed: Oct. 15, 1996

(30) Foreign Application Priority Data

Feb. 22, 1996 (JP) ............................................. 8-034457

(51) Int. Cl.$^7$ .............................................. H04B 10/00
(52) U.S. Cl. ...................... 359/158; 359/154; 359/189
(58) Field of Search ................................. 359/135, 154, 359/158, 160, 162, 189; 375/354

(56) References Cited

U.S. PATENT DOCUMENTS

| | | | | |
|---|---|---|---|---|
| 4,473,901 A | * | 9/1984 | Jensen | .......................... 370/520 |
| 5,369,520 A | * | 11/1994 | Avramopoulos | ............. 359/176 |
| 5,444,561 A | * | 8/1995 | Kaminishi | .................... 359/158 |
| 5,594,583 A | * | 1/1997 | Devaux | ....................... 359/158 |

FOREIGN PATENT DOCUMENTS

| | | |
|---|---|---|
| JP | A-6-76194 | 3/1994 |
| JP | A-7-162020 | 6/1995 |

OTHER PUBLICATIONS

English language Abstract of JP 03–195107, issued Aug. 26, 1991.
English language Abstract of JP 03–270504, issued Dec. 2, 1991.
English translation of "Notification of grounds of claim rejections" section of Japanese language Office Action, dated Feb. 25, 2003, in corresponding Japanese application 08–034457.

\* cited by examiner

*Primary Examiner*—Kinfe-Michael Negash
(74) *Attorney, Agent, or Firm*—Staas & Halsey LLP

(57) ABSTRACT

An apparatus for transmitting and receiving optical signals and which is independent of the optical transmission bit rate. The apparatus includes an optical transmitting unit and an optical receiving unit. The optical transmitting unit receives a clock signal and transmits an optical signal at a bit rate corresponding to the frequency of the clock signal. The optical receiving unit receives an optical signal, converts the received optical signal into an electrical signal and processes the electrical signal to be an electrical representation of the received optical signal. The optical receiving unit has frequency characteristics which are controllable in accordance with the frequency of the clock signal to control the processing of the electrical signal. For example, the optical receiving unit can include an amplifying unit which amplifies the electrical signal, wherein the gain and band of the amplifier are controllable in accordance with the frequency of the clock signal. Also, the optical receiving unit can include a filter for filtering the electrical signal, wherein the cut-off frequency of the filter is controllable in accordance with the frequency of the clock signal.

24 Claims, 10 Drawing Sheets

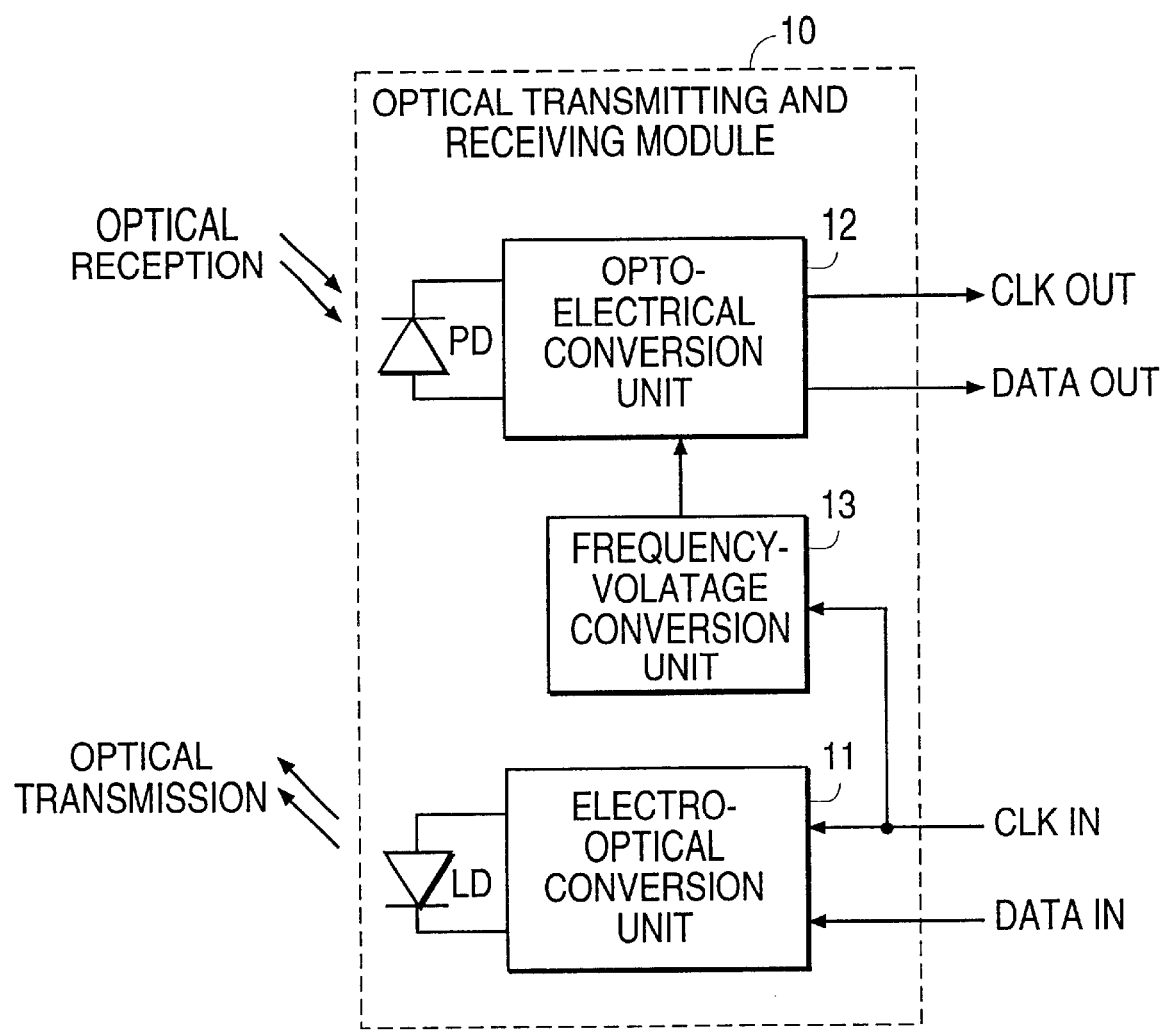

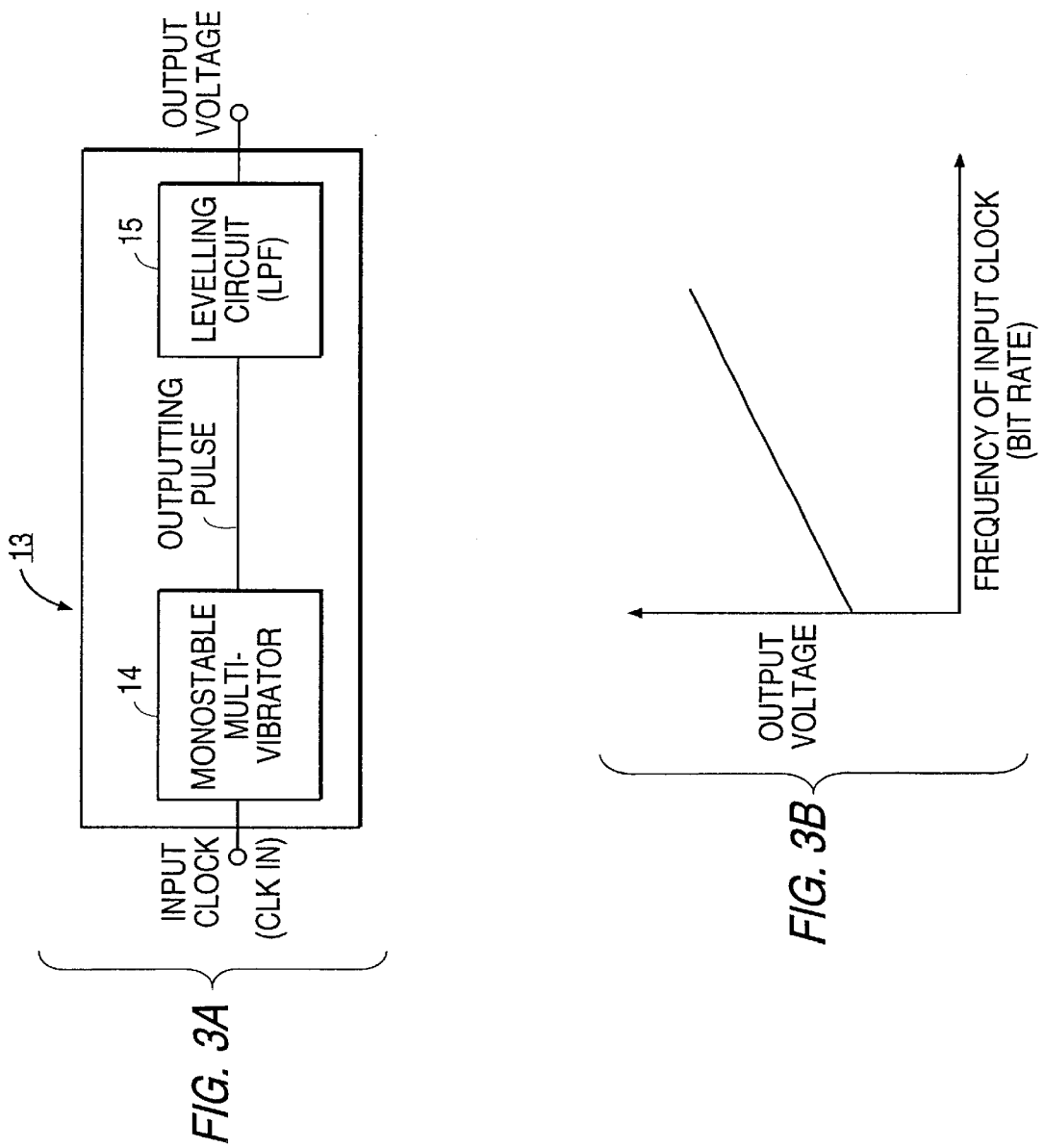

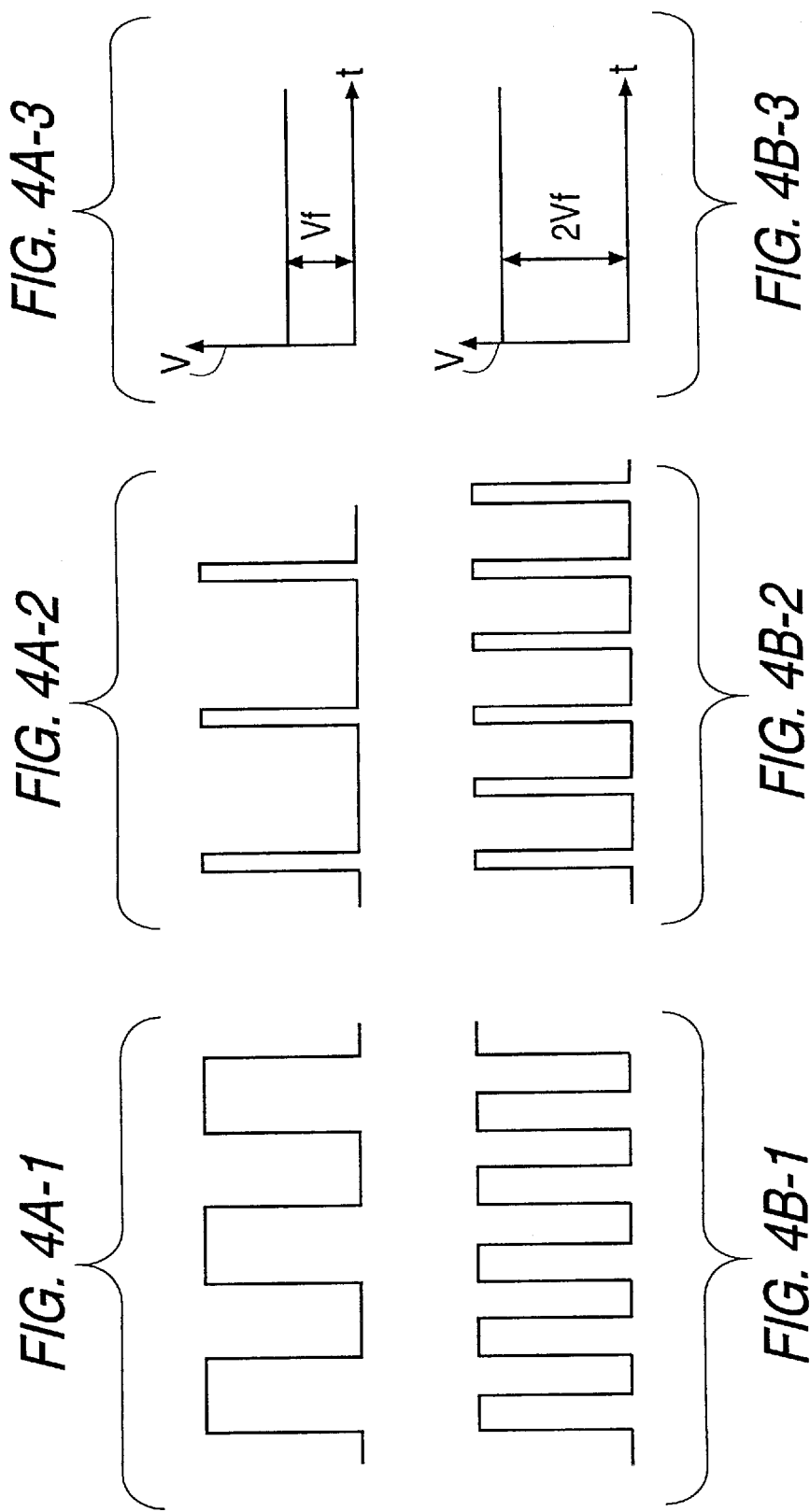

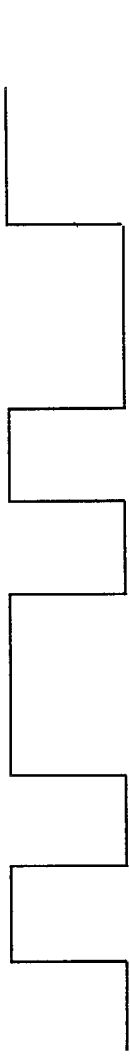
FIG. 9A OUTPUT SIGNAL OF MAIN AMPLIFIER 26
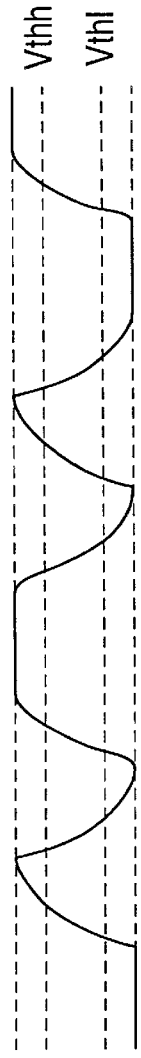
FIG. 9B OUTPUT OF LOW-PASS FILTER 31
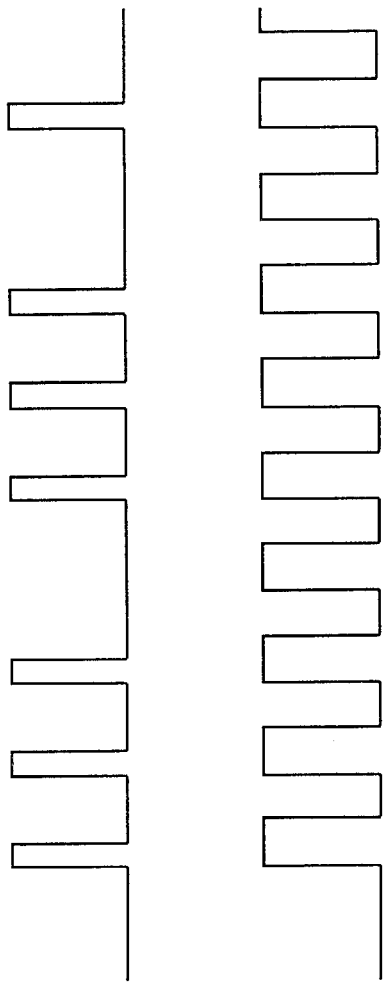
FIG. 9C OUTPUT SIGNAL OF WINDOW COMPARATOR
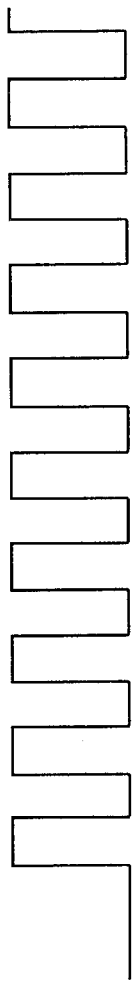
FIG. 9D TIMING OUTPUT

OPTICAL RECEIVING UNIT HAVING FREQUENCY CHARACTERISTICS WHICH ARE CONTROLLABLE IN ACCORDANCE WITH A CLOCK SIGNAL USED TO TRANSMIT DATA

CROSS-REFERENCE TO RELATED APPLICATIONS

This application is based on, and claims priority to, Japanese patent application number 08-034457 filed in Japan, and which is incorporated herein by reference.

BACKGROUND OF THE INVENTION

1. Field of the Invention

The present invention relates to an apparatus for transmitting and receiving optical signals, and having common components used for various optical transmission bit rates so that the apparatus is independent of the optical transmission bit rate.

2. Description of the Related Art

An optical communication system can provide relatively high-speed, large-capacity data transmission. Therefore, an optical communication system is often used to connect a large number of system users together. In such an optical communication system, data is modulated onto optical signals, and the optical signals are transmitted to different system users through optical fiber networks containing optical fiber transmission lines.

To transmit data, a system user employs an optical transmitting circuit (E/O circuit) to convert the data from an electrical signal (E) to an optical signal (O). The optical signal is then transmitted over an optical fiber transmission line. Similarly, to receive data, the system user employs an optical receiving circuit (O/E circuit) to convert a received optical signal (O) into an electric signal (E). The performance characteristics of the optical transmitting circuit and the optical receiving circuit greatly affect the quality of the communication.

Moreover, an optical communication system typically employs a large number of subscriber lines to accommodate the system users. Therefore, a large number of optical transmitting circuits and optical receiving circuits are required. In addition, system users typically subscribe to an optical communication system for many different services. These different services typically require different optical transmission bit rates, or bit rates, at which data is transmitted on the optical communication system. As a result, the system cost and complexity can undesireably increase if a different optical transmitting circuit must be designed and manufactured for transmitting each different optical transmission bit rate. Similarly, the system cost and complexity can undesireably increase if a different optical receiving circuit must be designed and manufactured for receiving each different optical transmission bit rate.

Therefore, it is desirable for an optical transmitting circuit to be capable of transmitting data at different optical transmission bit rates, and for an optical receiving circuit to be capable of receiving data at different optical transmission bit rates. Such an optical transmitting circuit and an optical receiving circuit could be mass-produced, thereby reducing the cost and complexity of the optical communication system.

Fortunately, a conventional optical transmitting circuit can be used to transmit data at different optical transmission bit rates. More specifically, a common-design optical transmitting circuit can be used to transmit data at different low-speed optical transmission bit rates (that is, 20 Mbps or less) over a subscriber line, as required for a particular service. For example, a common-design optical transmitting circuit can be used to transmit data at a bit rate of 1.5 Mbps over a first subscriber line, or to transmit data at a bit rate of 6 Mbps over a second subscriber line. Since the circuit configuration of the optical transmitting circuit is independent of bit-rate, the optical transmitting circuit is considered to be "bit-free", thereby allowing a greater degree of mass production.

Unfortunately, a conventional optical receiving circuit is dependent on bit rate, and a different optical receiving circuit must be used to receive data at different optical transmission bit rates. Therefore, an optical receiving circuit cannot be mass produced on a large-scale.

More specifically, an optical receiving circuit performs the bit-rate dependent functions of waveform re-shaping, re-timing and re-generation. These functions are typically referred to as the "3R" functions performed by an optical receiving circuit. If the re-timing function is omitted, the optical receiving circuit is considered to perform "2R" functions.

Waveform re-shaping refers to the generation of a waveform of a received optical signal. More specifically, when an optical signal is transmitted through an optical fiber, the higher-frequency component in the optical signal is attenuated by the optical fiber, in accordance with the frequency characteristics of the optical fiber. Therefore, the waveform of an optical signal received by the optical receiving circuit is different, or distorted, from the original waveform of the optical signal.

To perform re-shaping, an optical receiving circuit typically includes a preamplifier for generating a waveform of the received optical signal. The preamplifier should have a specific gain over a specific frequency band so that the re-shaping can appropriately compensate for loss in the transmission line. The specific gain and specific frequency band are dependent on the bit rate of the received optical signal. As a result, the waveform re-shaping function makes it difficult to provide a bit-free optical receiving circuit.

Re-timing refers to the detection of the timing of the received optical signal. Generally, the optical receiving circuit retrieves a clock component from the received optical signal, and determines the timing from the retrieved clock component. A filter is typically used to extract the clock component, and typically utilizes resonance at a frequency (bit rate) of the received optical signal. Therefore, the filter provides a bit-rate dependent oscillation system. As a result, the re-timing function makes it difficult to provide a bit-free optical receiving circuit.

Re-generation refers to the regeneration of the received signal at the timing detected by re-timing. Since re-generation relies on the bit-rate dependent re-timing function, re-generation is also a bit-rate dependant function.

In view of the above, a different optical receiving circuit performing the 3R functions is conventionally designed for each optical transmission bit rate. For example, if an optical receiving circuit is to be used with a transmission line having a bit rate 1.5 Mbps, the optical receiving circuit would be designed to have a gain and band which are optimized to amplify a signal of 1.5 Mbps. In addition, the optical receiving circuit would have an oscillation system which is resonant at 1.5 MHz, to extract a clock component from a 1.5 Mbps optical signal. Unfortunately, such an optical receiving circuit would not be appropriate for use on a transmission line having a different bit rate.

Therefore, the configuration of a conventional optical receiving circuit used in a transmission line at a certain bit rate is different from the configuration of an optical receiving circuit used in a transmission line having a different bit rate. Moreover, a conventional transmitting and receiving module which incorporates both an optical transmitting circuit and an optical receiving circuit for transmitting and receiving at a specific optical transmission bit rate must have a different configuration than an optical transmitting and receiving module for transmitting and receiving at a different optical transmission bit rate. As a result, many different optical receiving circuits and optical transmitting and receiving modules, having many different configurations, must be designed and manufactured, thereby increasing cost of the optical communication system.

SUMMARY OF THE INVENTION

Accordingly, it is an object of the present invention to provide an optical receiving circuit and an optical transmitting and receiving module having a bit-rate independent circuit configuration.

Objects and the present invention are achieved by providing an apparatus for transmitting and receiving optical signals and which is independent of the optical transmission bit rate. The apparatus includes an optical transmitting unit and an optical receiving unit. The optical transmitting unit receives a clock signal and transmits an optical signal at a bit rate corresponding to the frequency of the clock signal. The optical receiving unit receives an optical signal, converts the received optical signal into an electrical signal and processes the electrical signal to be an electrical representation of the received optical signal. The optical receiving unit has frequency characteristics which are controllable in accordance with the frequency of the clock signal to control the processing of the electrical signal.

BRIEF DESCRIPTION OF THE DRAWINGS

These and other objects and advantages of the invention will become apparent and more readily appreciated from the following description of the preferred embodiments, taken in conjunction with the accompanying drawings of which:

FIG. 2 is a diagram illustrating an optical transmitting and receiving module, according to an embodiment of the present invention.

FIG. 3A is a diagram illustrating a frequency-voltage conversion unit of an optical transmitting and receiving module, according to an embodiment of the present invention.

FIG. 3B is a graph illustrating the relationship between the frequency of an input clock signal and the output voltage of the frequency-voltage conversion unit illustrated in FIG. 3A, according to an embodiment of the present invention.

FIGS. 4A-1, 4A-2 and 4A-3 are diagrams illustrating waveforms at various connection points in the frequency-voltage conversion unit illustrated in FIG. 3A, for a first clock frequency, according to an embodiment of the present invention.

FIGS. 4B-1, 4B-2 and 4B-3 are diagrams illustrating waveforms at various connection points in the frequency-voltage conversion unit illustrated in FIG. 3A, for a second clock frequency, according to an embodiment of the present invention.

FIGS. 9A, 9B, 9C and 9D are diagrams illustrating waveforms at various connection points in the timing extracting unit illustrated in FIG. 8, according to an embodiment of the present invention.

DESCRIPTION OF THE PREFERRED EMBODIMENTS

Figure 1A:
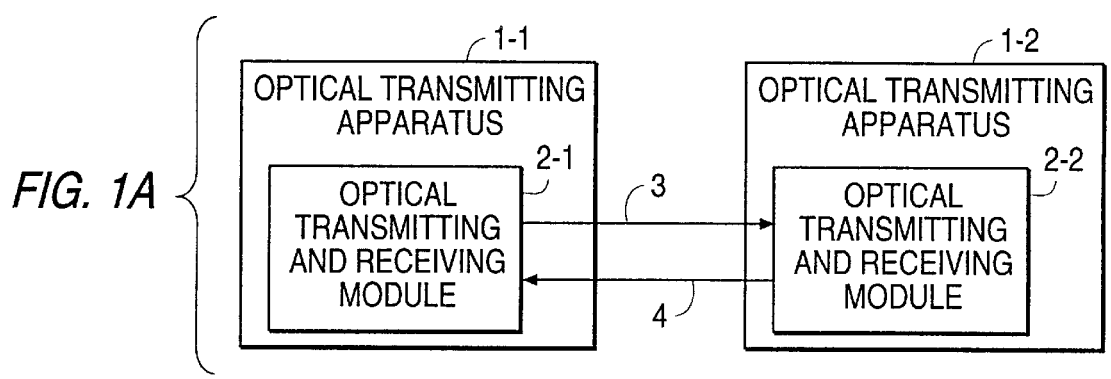
FIG. 1A is a diagram illustrating an optical system having a transmitting and receiving module, according to an embodiment of the present invention.

Reference will now be made in detail to the present preferred embodiments of the present invention, examples of which are illustrated in the accompanying drawings, wherein like reference numerals refer to like elements throughout.

FIG. 1A is a diagram illustrating an optical system having a transmitting and receiving module, according to an embodiment of the present invention. Referring now to FIG. 1A, an optical signal is bi-directionally transmitted and received between optical transmitting apparatuses 1-1 and 1-2. Optical transmitting apparatuses 1-1 and 1-2 comprise optical transmitting and receiving modules 2-1 and 2-2, respectively. An optical signal from optical transmitting and receiving module 2-1 is transmitted through an optical fiber 3 and received by optical transmitting and receiving module 2-2. Similarly, an optical signal from optical transmitting and receiving module 2-2 is transmitted through an optical fiber 4 and received by optical transmitting and receiving module 2-1.

If the system shown in FIG. 1A is a subscriber network., then optical transmitting apparatus 1-1 is provided in, for example, an optical interface unit (not illustrated) at a subscriber terminal unit (not illustrated), and optical transmitting apparatus 1-2 is provided in a switching unit (not illustrated). In this case, optical fibers 3 and 4 are subscriber lines.

Figure 1B:
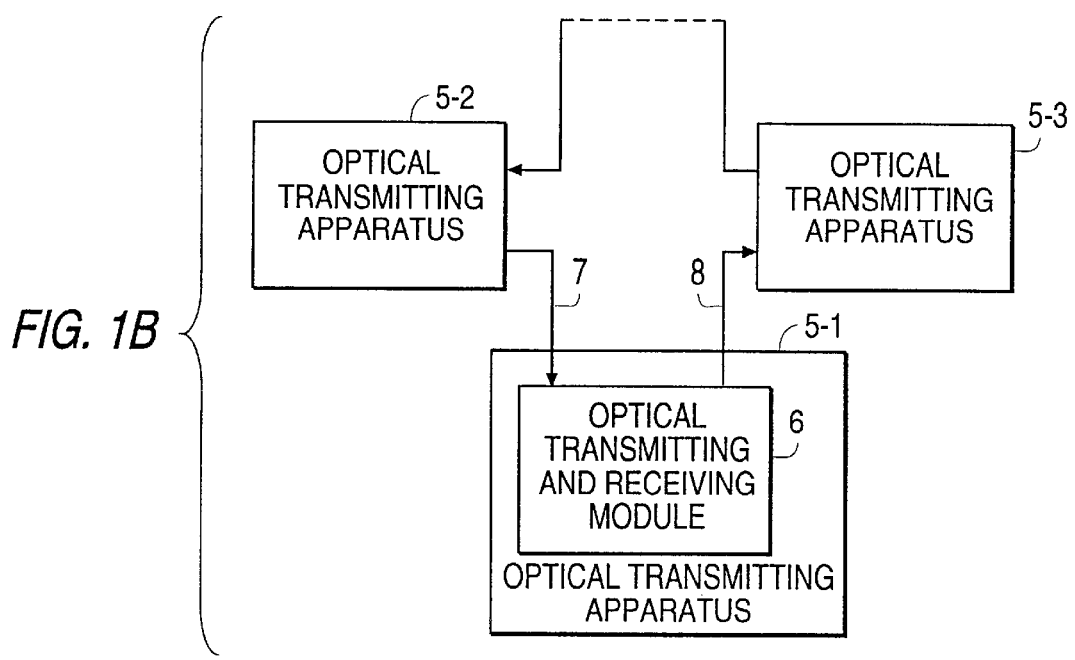
FIG. 1B is a diagram illustrating an additional optical system having a transmitting and receiving module, according to an embodiment of the present invention.

FIG. 1B is a diagram illustrating an additional optical system having a transmitting and receiving module, according to an embodiment of the present invention. More specifically, FIG. 1B illustrates, for example, a ring-shaped network in which an optical signal is transmitted by a first optical transmitting apparatus to a second optical transmitting apparatus, and then retransmitted from the second optical transmitting apparatus to a third optical transmitting apparatus.

Referring now to FIG. 1B, an optical transmitting apparatus 5-1 comprises an optical transmitting and receiving module 6, and receives an optical signal transmitted from an optical transmitting apparatus 5-2 through an optical fiber 7. Optical transmitting apparatus 5-1 transmits the optical signal to an optical transmitting apparatus 5-3 through an optical fiber 8. Optical transmitting apparatuses 5-1, 5-2 and 5-3 are terminal units connected to, for example, a ring-shaped LAN (local area network) in a token-ring system. In this case, optical fibers 7 and 8 are transmission lines connecting terminal units.

When an optical transmitting and receiving module according to embodiments of the present embodiment is used as optical transmitting and receiving module 2-1 or 2-2 illustrated in FIG. 1A, it is assumed that optical fibers 3 and 4 are identical in bit rate (optical transmission bit rate) This configuration is commonly used in a subscriber system having, for example, an asynchronous transfer mode (ATM) network. Similarly, when an optical transmitting and receiving module, according to embodiments of the present embodiment, is used as optical transmitting and receiving module 6 illustrated in FIG. 1B, it is assumed that optical fibers 7 and 8 are identical in bit rate. The bit rate of a transmitted or received optical signal is generally referred to as an optical transmission bit rate.

FIG. 2 is a diagram illustrating an optical transmitting and receiving module 10, according to an embodiment of the present invention. Optical transmitting and receiving module 10 corresponds to optical transmitting and receiving module 2-1 or 2-2 illustrated in FIG. 1A, and to optical transmitting and receiving module 6 illustrated in FIG. 1B.

Referring now to FIG. 2, an electro-optical conversion unit 11 comprises a laser diode LD and receives data DATA IN and an input clock signal CLK IN. The data DATA IN is converted into an optical signal by laser diode LD, and output therefrom. The input clock signal CLK IN is a timing signal for transmitting the data DATA IN as an optical signal, and the frequency of the input clock signal is CLK IN represents a bit rate for transmitting the data DATA IN on a transmission line. The input clock signal CLK IN is generated in optical transmitting apparatus 10 independent of an optical signal received by optical transmitting apparatus 10.

An opto-electrical conversion unit 12 comprises a photodiode PD which converts a received optical signal into an electric signal. The electrical signal is output from opto-electrical conversion unit 12 as data DATA OUT. Opto-electrical conversion unit 12 extracts a clock signal CLK OUT from the received optical signal. The data DATA OUT is a re-timed signal.

A frequency-voltage conversion unit 13 receives the input clock signal CLK IN and outputs a voltage proportional to the frequency of the input clock signal CLK IN. The bit rate (that is, the frequency of input clock signal CLK IN) of an optical signal transmitted from optical transmitting and receiving module 10 is identical to that of an optical signal received by optical transmitting and receiving module 10. As described above, the bit rate is generally referred to as an optical transmission bit rate. Therefore, frequency-voltage conversion unit 13 outputs a voltage proportional to the optical transmission bit rate.

The voltage output from frequency-voltage conversion unit 13 is provided to opto-electrical conversion unit 12. In accordance with the voltage output from frequency-voltage conversion unit 13, opto-electrical conversion unit 12 controls frequency characteristics of components (not illustrated in FIG. 2) therein when an optical signal is converted into an electric signal.

Thus, the input clock signal CLK IN is used to transmit data DATA IN as an optical signal. This input clock signal CLK IN is used to control frequency characteristics of components inside optical transmitting and receiving module 10 when a received optical signal is converted into an electric signal. As a result, the frequency characteristics can be controlled according to the optical transmission bit rate.

FIG. 3A is a diagram illustrating frequency-voltage conversion unit 13 of optical transmitting and receiving module 10, according to an embodiment of the present invention. Referring now to FIG. 3A, a monostable multi-vibrator 14 receives the input clock signal CLK IN and outputs a pulse of a predetermined pulse width each time a leading edge is detected. A levelling circuit 15 levels the output of monostable multi-vibrator 14, to produce a voltage which is an average value of the output of monostable multi-vibrator 14. Levelling circuit 15 is, for example, a low-pass filter.

FIG. 3B is a graph illustrating the relationship between the frequency of the input clock signal CLK IN and the output voltage of frequency-voltage conversion unit 13 illustrated in FIG. 3A, according to an embodiment of the present invention.

FIG. 4A-1 is a diagram illustrating an input clock signal CLK IN provided to frequency-voltage conversion unit 13 and having a frequency f. The input clock signal CLK IN is received by monostable multi-vibrator 14.

FIG. 4A-2 is a diagram illustrating pulses generated by monostable multi-vibrator 14, for input clock signal CLK IN having a frequency f. Referring now to FIG. 4A-2, monostable multi-vibrator produces a pulse of a predetermined pulse width at each leading edge of the input clock signal CLK IN. At this time, the pulse width of each pulse is constant, independent of the frequency of the input clock signal CLK IN. The pluses generated by monostable multi-vibrator 14 are received by levelling circuit 15.

FIG. 4A-3 is a diagram illustrating the output voltage produced by levelling circuit 15 and output from monostable multi-vibrator 14, for input clock signal CLK IN having a frequency f. As illustrated in FIG. 4A-3, levelling circuit 15 levels the pulses generated by monostable multi-vibrator 14, to produce a leveled output voltage.

FIG. 4B-1 is a diagram illustrating an input clock signal CLK IN provided to frequency-voltage conversion unit 13 and having a frequency $2f$ (that is, twice the frequency of the input clock signal CLK IN illustrated in FIG. 4A-1). FIG. 4B-2 is a diagram illustrating pulses generated by monostable multi-vibrator 14, for input clock signal CLK IN having a frequency $2f$. FIG. 4B-3 is a diagram illustrating the output voltage produced by levelling circuit 15 and output from monostable multi-vibrator 14, for input clock signal CLK IN having a frequency $2f$.

As can be seen by comparing FIGS. 4A-1, 4A-2 and 4A-3 to FIGS. 4B-1, 4B-2 and 4B-3, the number of pulses generated by monostable multi-vibrator 14 per unit of time is doubled if the frequency of the input clock signal CLK IN is doubled. Therefore, if the frequency of the input clock signal CLK IN is doubled, the output voltage produced by levelling circuit 15 is doubled. Thus, frequency-voltage conversion unit 13 outputs a voltage which is proportional to the frequency of input clock signal CLK IN, as illustrated in FIG. 3B.

Figure 5:
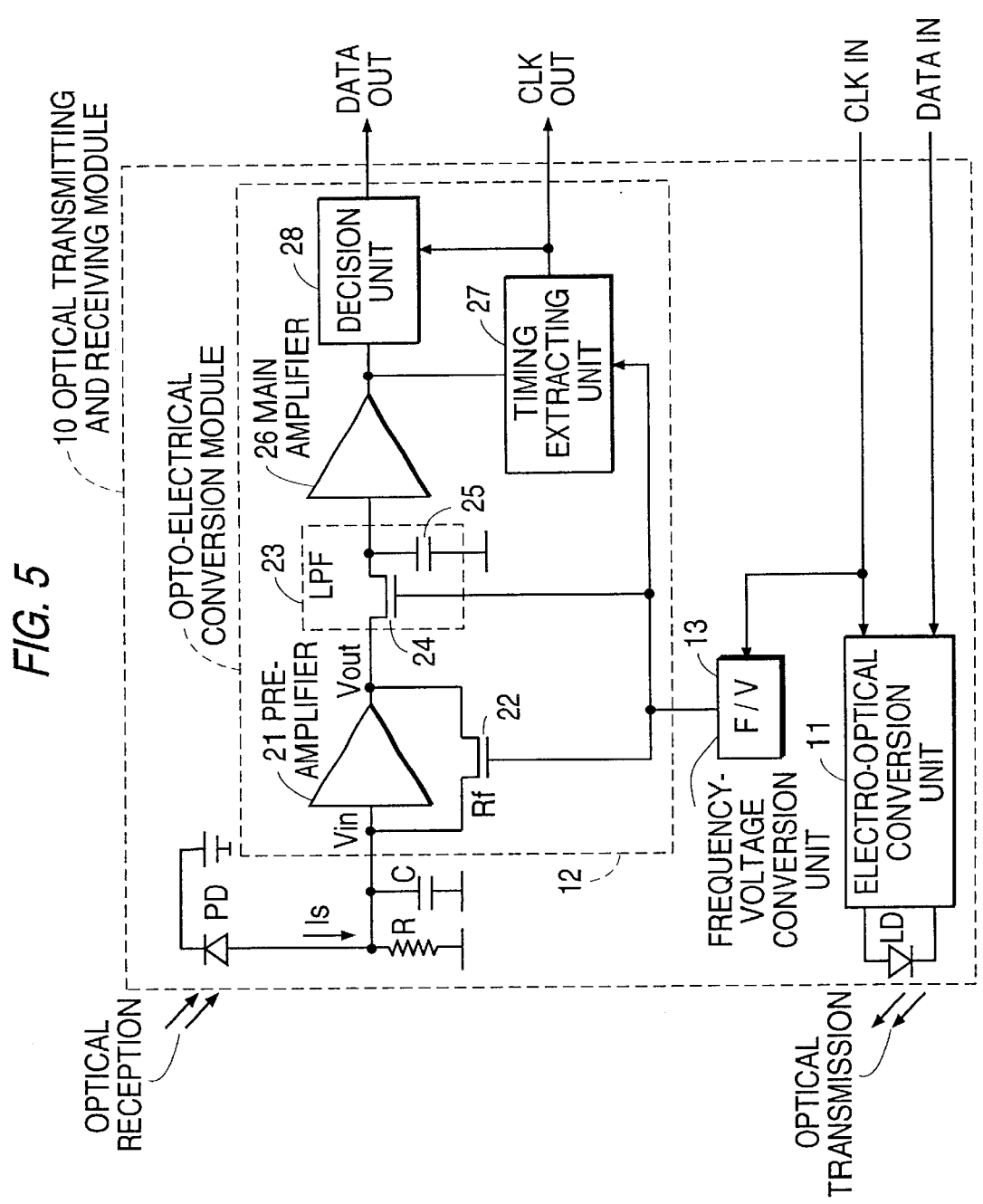
FIG. 5 is a diagram illustrating an optical transmitting and receiving module, according to an embodiment of the present invention.

FIG. 5 is a diagram illustrating an optical transmitting and receiving module, according to an embodiment of the present invention. Referring now to FIG. 5, opto-electrical conversion unit 12 receives an optical signal, and processes the optical signal with a preamplifier 21 and a low-pass filter 23. A timing extracting unit 27 extracts a clock signal from the received signal, and a decision unit 28 re-times and outputs the received signal. Preamplifier 21, low-pass filter 23, and timing extracting unit 27 receive output voltages from frequency-voltage conversion unit 13. Frequency characteristics of preamplifier 21, low-pass filter 23 and timing extracting unit 27 are then adjusted in accordance with the voltages received from frequency-voltage conversion unit 13. Since the voltage received from frequency-voltage conversion unit 13 corresponds to the optical transmission bit rate, the frequency characteristics of preamplifier 21, low-pass filter 23, and timing extracting unit 27 are adjusted in accordance with the optical transmission bit rate.

Therefore, optical transmitting and receiving module 10 recognizes the optical transmission bit rate based on a clock signal (input clock signal CLK IN) for use in transmitting data from electro-optical conversion unit 11, and controls frequency characteristics of opto-electrical conversion unit 12 in accordance with the optical transmission bit rate. Thus, opto-electrical conversion unit 12 optimizes the adjustment of the frequency characteristics in accordance with the optical transmission bit rate.

Preamplifier 21 is, for example, a transimpedance-type amplifier, and re-shapes the waveform of an electric signal obtained by opto-electrical conversion in photodiode PD. The frequency characteristics of preamplifier 21 are set so that the gain of preamplifier 21 compensates for loss in the transmission line. Such loss in the transmission line occurs, for example, from attenuation of high-frequency components of the optical signal in accordance with the frequency characteristics of the transmission line.

Preamplifier 21 is provided with a feedback resistor 22 having a resistance value which changes in accordance with an applied voltage. For example, feedback resistor 22 can be a MOS-type transistor or a switching capacitor. Assuming that feedback resistor 22 is a MOS-type transistor, an output voltage of frequency-voltage conversion unit 13 is applied to the gate of the MOS-type transistor functioning as feedback resistor 22. The source and drain of the MOS-type transistor are respectively connected to the input and output of preamplifier 21. Therefore, the electric current flowing through the MOS-type transistor can be controlled by the output voltage of frequency-voltage conversion unit 13. That is, the resistance value of feedback resistor 22 can be controlled by the output voltage of frequency-voltage conversion unit 13.

Figure 6:
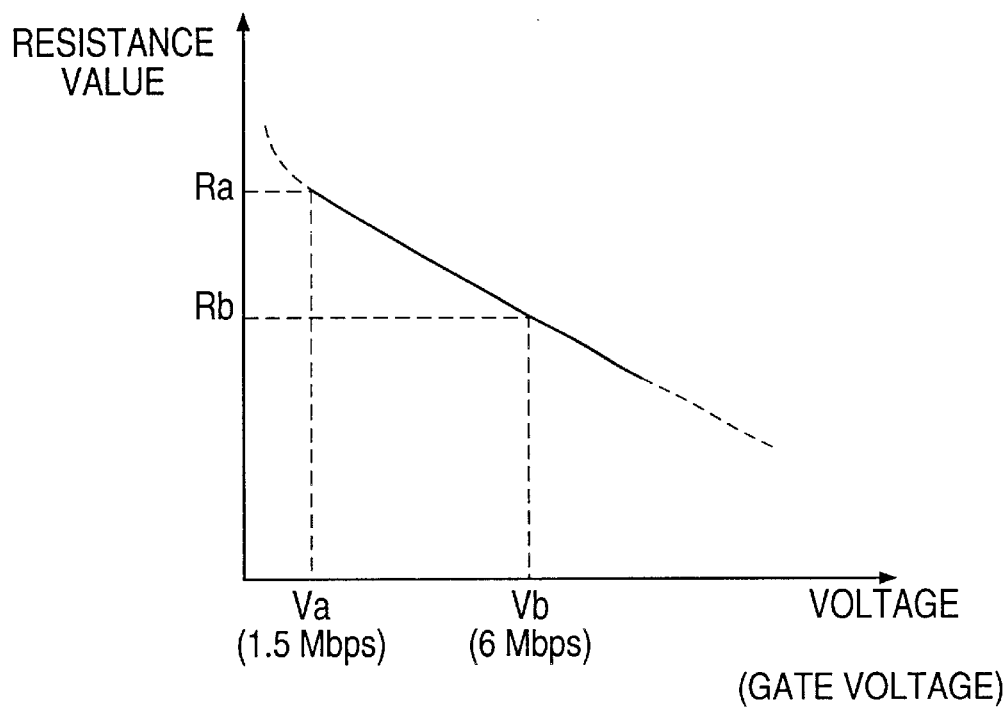
FIG. 6 is a graph illustrating the relationship between the output voltage of a frequency-voltage conversion unit and a resistance value for controlling a preamplifier of the optical transmitting and receiving module illustrated in FIG. 5, according to an embodiment of the present invention.

FIG. 6 is a graph illustrating the relationship between the output voltage of frequency-voltage conversion unit 13 and a resistance value of feedback resistor 22 for controlling preamplifier 21. Referring now to FIG. 6, as the output voltage of frequency-voltage conversion unit 13 increases, the voltage applied to the gate of the MOS-type transistor increases, thereby lowering the resistance value of feedback resistor 22. Over a voltage range Va to Vb, there is a linear relationship between the output voltage of frequency-voltage conversion unit 13 and the resistance value of feedback resistor 22. Thus, during this range, the resistance value of feedback resistor 22 will linearly decrease as the output voltage of frequency-voltage conversion unit 13 increases. As a result, the resistance value of feedback resistor 22 can be precisely controlled in this linearly correlated range. The relationship between the output voltage of frequency-voltage conversion unit 13 and the resistance of feedback resistor 22 (that is, the relationship between size of the resistance value and slope of the graph illustrated in FIG. 6) can be optionally set by appropriately selecting the density of impurity and the distance between the source and drain in each semiconductor area of the MOS-type transistor.

Assuming that the gain of preamplifier 21 is A, the band of preamplifier 21 is fc, the resistance value of feedback resistor 22 is Rfl, and the free gain AO of preamplifier 21 is large enough, the following equations apply:

$$A = V_{out}/V_{in} = -Rfl/Zin \qquad (1)$$

$$fc = AO/(2\pi Rfl \cdot C) \qquad (2)$$

where $$Zin = (1/R + j\omega C)^{-1} \qquad (3)$$

$$V_{in} = Zin \cdot I_s \qquad (4)$$

In Equations (1) through (4), above, R (see FIG. 5) is a resistance value of a resistor provided at the input of preamplifier 21; C (see FIG. 5) is an input capacitance of preamplifier 21; $I_s$ (see FIG. 5) is an electric current value of the electric current generated by photodiode PD; and Zin is an input impedance of preamplifier 21.

The band fc almost equals the cut-off frequency at a high frequency range of preamplifier 21. That is, the band of preamplifier 21 is normally defined as the difference between the cut-off frequency at a high frequency band and the cut-off frequency at a low frequency band. However, in the present example, it is assumed that the cut-off frequency at a low frequency band is small, and the cut-off frequency at a high-frequency band is accepted. The cut-off frequency almost equals the frequency at which the voltage gain is lowered by 3 dB.

Therefore, as indicated by Equations (1) and (2), above, the gain A and band fc of preamplifier 21 are controlled using the resistance value Rfl of the feedback resistor 22. Since the resistance value Rfl of feedback resistor 22 is controlled by the output voltage of frequency-voltage conversion unit 13, the frequency characteristics of preamplifier 21 are controlled in accordance with the optical transmission bit rate.

To summarize, the adjustment of frequency characteristics of preamplifier 21 is automatically performed according to the output voltage of frequency-voltage conversion unit 13. The output voltage of frequency-voltage conversion unit 13 is proportional to the frequency of the input clock signal CLK IN. However, since the optical transmission bit rate is equal to the optical reception bit rate, the output voltage of frequency-voltage conversion unit 13 is proportional to the optical reception bit rate. Therefore, the frequency characteristics are automatically adjusted in preamplifier 21 and low-pass filter 23 based on the optical reception bit rate.

The frequency characteristics of preamplifier 21 are adjusted by controlling the resistance value of feedback resistor 22 using the output voltage of frequency-voltage conversion unit 13. That is, according to the Equations (1) and (2), above, the resistance value Rfl of feedback resistor 22 is controlled so that the gain A and band fc of preamplifier 21 are optimized for the optical transmission bit rate. The angular frequency corresponding to the optical transmission bit rate is $\omega$ in Equation (3), above.

The optimum value for the band fc is, for example, double the frequency corresponding to the optical transmission bit rate. If the optical transmission bit rate is 1.5 Mbps, then the band fc is set to approximately 3 MHz. The gain A has a trade-off relation to the band fc. It is desirable for the gain A to be set to an optimum value for the timing extracting unit 27 and decision unit 28 when the amplification signal of preamplifier 21 passes through the low-pass filter 23 and main amplifier 26. Therefore, the gain A is set to a predetermined value after the band fc is set. Then, the resistance value Rfl of feedback resistor 22 can be controlled to satisfy the optimum value.

The resistance value of the feedback resistor 22 decreases with an increasing output voltage of the frequency-voltage conversion unit 13, as shown in FIG. 6. That is, as the optical transmission bit rate increases, the resistance value of feedback resistor 22 decreases. In FIG. 6, the output voltages of the frequency-voltage conversion unit 13 are Va and Vb when the optical transmission bit rates (that is, the frequency of the input clock signal CLK IN) are 1.5 Mbps and 6 Mbps respectively, and the resistance values of feedback resistor 22 are Ra and Rb.

The relationship between the voltage and resistance value (size of the resistance value and slope of the graph shown in FIG. 6) can be optionally set as described above. According to the present embodiment, Ra is set in a way that the band fc is approximately 3 MHz when Rfl=Ra and that Rb is set in a way that the band fc is approximately 12 MHz when Rfl=Rb in the above Equations (1) and (4) That is, the MOS-type transistor (feedback resistor 22) is designed such that Ra and Rb meet these conditions. If the characteristics of feedback resistor 22 are designed in this manner, then the band fc of preamplifier 21 is automatically set to 3 MHz when the optical transmitting and receiving module 10 is used for a transmission line having the optical transmission bit rate of 1.5 Mbps, and the band fc of preamplifier 21 is set to about 12 MHz when the optical transmitting and receiving module 10 is used for a transmission line having the optical transmission bit rate of 6 Mbps. The gain A of the preamplifier 21 is automatically set correspondingly.

Therefore, according to the above embodiments of the present invention, an optical receiving circuit converts an optical signal into an electrical signal. The optical receiving circuit includes an amplifying unit (for example, preamplifier 21) for amplifying the electrical signal. The amplifying unit has a gain and band which are controllable in accordance with the frequency of a clock signal used to transmit data. Thus, the gain and band of the amplifying unit are frequency characteristics of the optical receiving unit which are controllable in accordance with the clock signal to control processing of the electrical signal.

Referring again to FIG. 5, low-pass filter 23 receives an output signal from preamplifier 21, and removes high-frequency components from the output signal. That is, low-pass filter 23 moderates the leading and trailing edges of the output signal of preamplifier 21, to produce a moderate waveform to extend the range of the receivable optical level. For example, when an optical transmission line is long, the optical level at which photodiode PD receives a light is small. Therefore, the electric current $I_s$ generated by photodiode PD is small. If the electric current $I_s$ is small, the amplitude of the signal is small. If high-frequency components, such as noise, are included with a signal having a small amplitude, a clock component may not be accurately extracted by timing extracting unit 27, or a bit error may arise when a signal is regenerated by decision unit 28.

To moderate the leading and trailing edges of the output signal of preamplifier 21, the cut-off frequency of low-pass filter 23 is adjusted to extend the range of the optical reception level at which opto-electrical conversion unit 12 can correctly regenerate a signal. In this case, the cut-off frequency is set to about 70%. of the optical transmission bit rate. Therefore, optical transmitting and receiving module 10 controls the cutoff frequency of low-pass filter 23 to be set to approximately 70% of the optical transmission bit rate to extend the range of the optical reception level at which the optical receiving circuit can correctly regenerate an electric signal.

Low-pass filter 23 is an RC circuit comprising a resistor 24 and a capacitor 25. Similar to feedback resistor 22, resistor 24 changes in resistance value based on an applied voltage, and can be an MOS-type transistor. An output voltage of frequency-voltage conversion unit 13 is applied to the resistor 24, to control the resistance value.

Assuming that V1 and V2 are the input voltage and output voltage, respectively, of low-pass filter 23, Rf2 is the resistance value of resistor 24, C is the capacitance of capacitor 25, and ω is an angular frequency, the characteristics of a common RC circuit are expressed by the following equation:

$$V2/V1 = 1/(1+j\omega C \cdot Rf2) \quad (5)$$

If $1/(C\,Rf2)=\omega 0$ in Equation (5), above, low-pass filter 23 passes an alternating current having an angular frequency equal to or lower than ω0, and cuts off alternating current having an angular frequency higher than ω0. Therefore, the cut-off frequency ω0 of low-pass filter 23 can be controlled using the resistance value Rf2 of the resistor 24. Since the resistance value Rf2 of resistor 24 is controlled by the output voltage of frequency-voltage conversion unit 13, the frequency characteristics of low-pass filter 23 are controlled in accordance with the optical transmission bit rate.

To summarize, the frequency characteristics of low-pass filter 23 are adjusted by controlling the resistance value of resistor 24 using the output voltage from frequency-voltage conversion unit 13. That is, according to Equation (5), above, the resistance value Rf2 of resistor 24 is controlled to obtain the optimum cut-off frequency ω0 (ω0=1/(C Rf2)) for the optical transmission bit rate. The angular frequency corresponding to the optical transmission bit rate is defined as ω in Equation (5), above.

It is recommended that cut-off frequency ω0 is constantly about 70% of the optical transmission bit rate. That is, if the optical transmission bit rate is 1.5 Mbps, then the cut-off frequency ω0 of low-pass filter 23 is set to 1.05 MHz. If the optical transmission bit rate is 6 Mbps, then the cut-off frequency ω0 of low-pass filter 23 is set to 4.2 MHz. That is, the MOS-type transistor (resistor 24) and capacitor 25 are designed to meet these conditions.

If the characteristics of resistor 24 (resistance value for the applied voltage) are thus designed, then the cut-off frequency of low-pass filter 23 is automatically set to 1.05 MHz when optical transmitting and receiving module 10 is used for a transmission line having the optical transmission bit rate of 1.5 Mbps, and the frequency is set to about 4.2 MHz when optical transmitting and receiving module 10 is used for a transmission line having the optical transmission bit rate of 6 Mbps.

Therefore, according to the above embodiments of the present invention, an optical receiving circuit converts an optical signal into an electrical signal. The optical receiving circuit includes an amplifying unit (for example, preamplifier 21) for amplifying the electrical signal. A filter (for example, low-pass filter 23) filters the amplified electrical signal. The filter has a cut-off frequency which is controllable in accordance with the frequency of a clock signal used to transmit data. Thus, the cut-off frequency of the filter is a frequency characteristic of the optical receiving unit which is controllable in accordance with the clock signal to control processing of the electrical signal.

Referring again to FIG. 5, a main amplifier 26 amplifies an output signal from low-pass filter 23 at a predetermined gain. The signal amplified by main amplifier 26 is transferred to timing extracting unit 27 and decision unit 28. Timing extracting unit 27 then extracts a clock component from the output signal of main amplifier 26. More specifically, timing extracting unit 27 extracts a timing signal from the optical signal received by optical transmitting and receiving module 10. The clock signal extracted by timing extracting unit 27 is output as a clock signal CLK OUT and transferred to decision unit 28. Decision unit 28 re-times the output signal of main amplifier 26 using the clock signal CLK OUT, and outputs a re-timed output signal DATA OUT. The clock signal CLK OUT can also be used for other signal processing by optical transmitting and receiving module 10.

Figure 7:
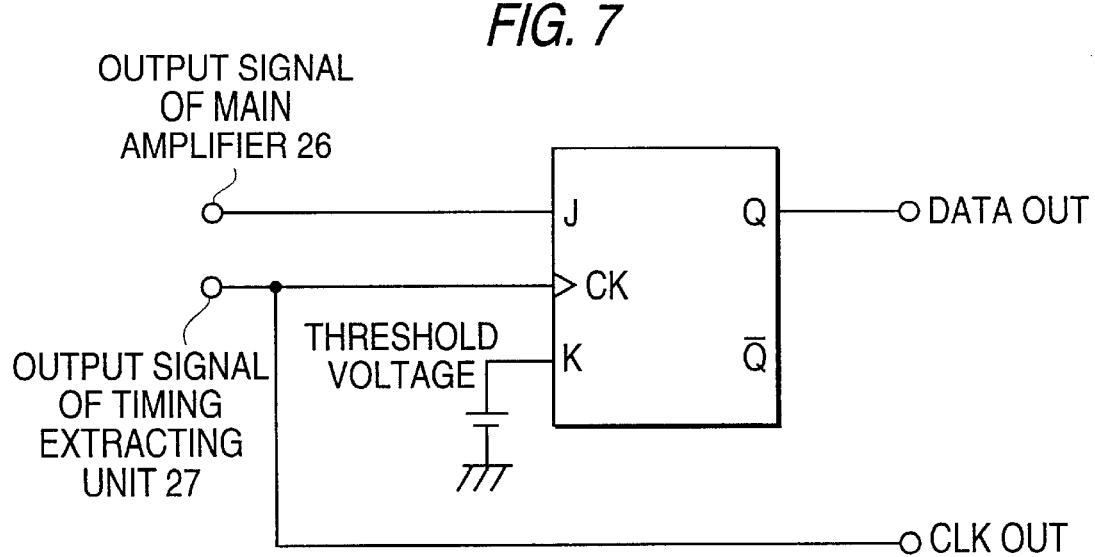
FIG. 7 is a diagram illustrating a decision unit of the optical transmitting and receiving module illustrated in FIG. 5, according to an embodiment of the present invention.

FIG. 7 is a diagram illustrating decision unit 28, according to an embodiment of the present invention. Referring now to FIG. 7, decision unit 28 is, for example, an edge-trigger-type flip-flop which receives the clock signal CLK OUT at a CK terminal, and checks the logical values at J and K terminals at the timing of the leading or trailing edge. An output signal from main amplifier 26 is input to the J terminal and a threshold voltage is set at the K terminal. Therefore, decision unit 28 fetches an output signal from main amplifier 26 at the timing of the edge of the clock signal CLK OUT, and outputs it as an output signal DATA OUT.

Figure 8:
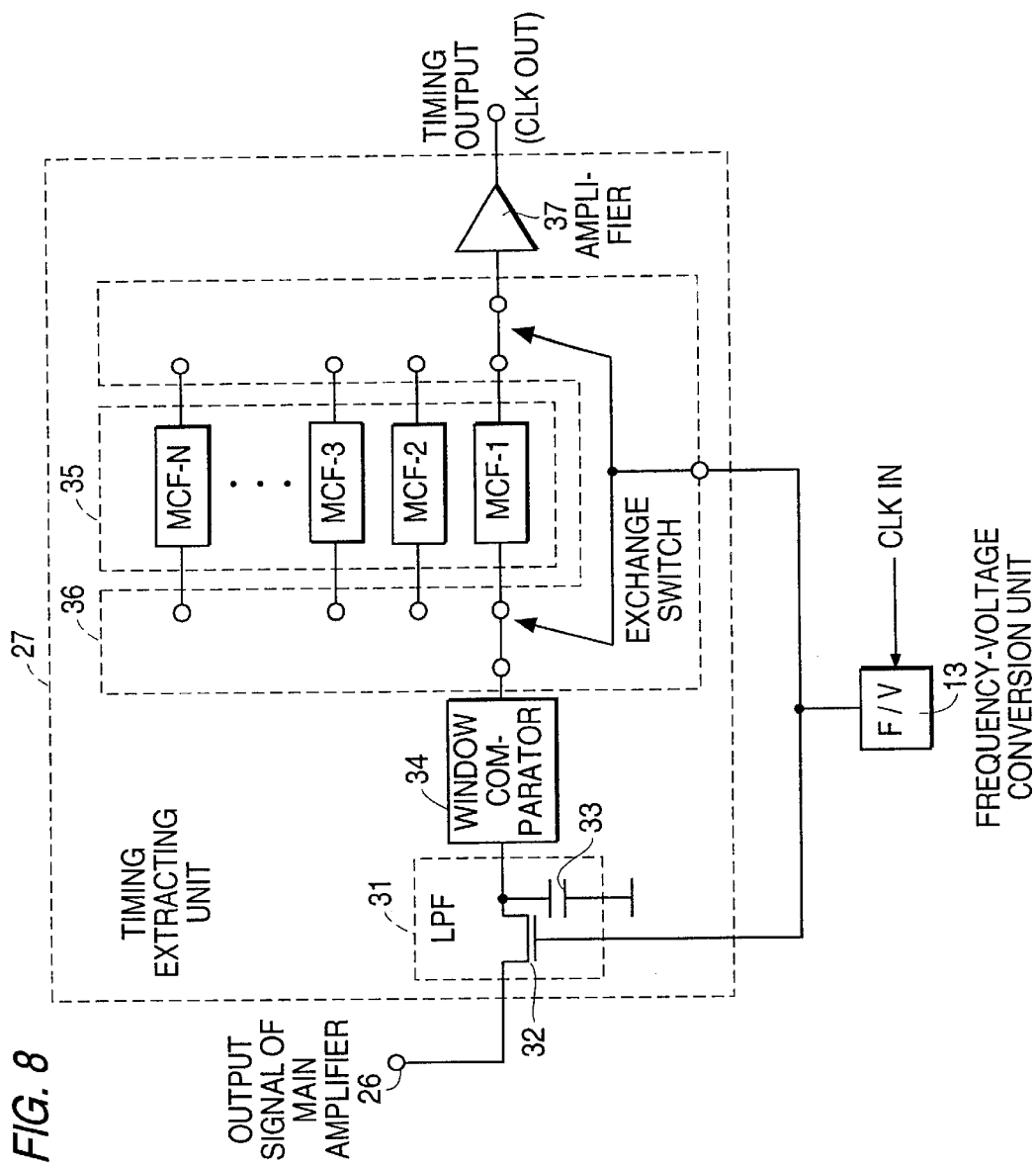
FIG. 8 is a diagram illustrating a timing extracting unit of the optical transmitting and receiving module illustrated in FIG. 5, according to an embodiment of the present invention.

FIG. 8 is a diagram illustrating timing extracting unit 27 of optical transmitting and receiving module 10, according to an embodiment of the present invention. Referring now to FIG. 8, timing extracting unit 27 includes a low-pass filter 31, a window comparator 34, a filter unit 35 and an amplifier 37. Filter unit 35 includes N mechanical filters MCF-1 through MCF-N. Timing extracting unit 27 selects a predetermined mechanical filter MCF-1 through MCF-N based on the optical transmission bit rate to extract a clock component of an optical signal received by optical transmitting and receiving module 10.

When optical transmitting and receiving module 10 is used with an optical transmission line of a specific bit rate, the cut-off frequency of low-pass filter 31 is automatically optimized for the bit rate, and a mechanical filter of filter unit 35 corresponding to the bit rate is automatically selected by timing extracting unit 27. In this manner, timing extracting unit 27 extracts a clock component from the received optical signal of the above described bit rate.

Low-pass filter 31 removes high-frequency components from the output signal of main amplifier 26 and moderates the leading and trailing edges of the signal. That is, the signal waveform is made moderate. Low-pass filter 31 is, for example, identical in configuration to low-pass filter 23 illustrated in FIG. 5, and comprises a resistor 32 and a capacitor 33. Resistor 32 has a resistance value which changes in accordance with an applied voltage. Resistor 32 can be, for example, a MOS-type transistor.

Frequency characteristics (for example, the cut-off frequency) of low-pass filter 31 can be adjusted by controlling the resistance value of resistor 32 using the output voltage of frequency-voltage conversion unit 13. More specifically, the cut-off frequency of low-pass filter 31 can be automatically adjusted based on the optical transmission bit rate.

Window comparator 34 has two thresholds Vthh and Vthl, and compares the output signal from low-pass filter 31 with each of the two thresholds. Window comparator 34 outputs a high signal "HH" when the output signal of low-pass filter 31 is between the thresholds Vthh and Vthl, and outputs a low signal "LZ" when the output signal of low-pass filter 31 is larger than the threshold Vthh and smaller than the threshold Vthl.

Each of the N mechanical filters MCF-1 through MCF-N of filter unit 35 passes only the signal having a specified frequency. A specified frequency refers to a bit rate assignable to an optical transmission line. For example, 1.5 MHz, 4 MHz, 6 MHz and 16 MHz represent such assignable bit rates.

Each mechanical filter MCF-1 through MCF-N includes a mechanical resonant system (not illustrated) and a transducer (not illustrated). An electric input to a respective mechanical filter is converted into mechanical representation and provided for the mechanical resonant system. The mechanical representation output from the mechanical resonant system is converted again into an electric signal by the transducer, and output as an electric signal.

The mechanical resonant system comprises a resonator (not illustrated) and a coupler (not illustrated), and the configuration depends on the combination of a oscillation mode and the coupling position of the coupler. The oscillation mode can be, for example, a vertical oscillation mode, a torsional oscillation mode or a flexing oscillation mode.

Thus, each mechanical filter MCF-1 through MCF-N contains a mechanical resonant system to pass a signal at only the resonant frequency of the filter. For example, if the resonant frequency of mechanical filter MCF-1 is 1.5 MHz, then the output of mechanical filter MCF-1 is a clock signal of 1.5 MHz.

Therefore, according to the above embodiments of the present invention, an optical receiving circuit converts an optical signal into an electrical signal. The resonant frequencies of mechanical filters MCF-1 through MCF-N are frequency characteristics of the optical receiving circuit which are controllable in accordance with a clock signal to control processing of the electrical signal.

Filter unit 35 is not intended to be limited to including mechanical filter. Instead, for example, mechanical filters MCF-1 through MCF-N can be replaced with crystal filters, ceramic filters or other types of filters.

An exchange switch 36 selects a respective mechanical filter MCF-1 through MCF-N based on the output voltage of frequency-voltage conversion unit 13, and switches a contact point to filter the output signal from window comparator 34 through the selected mechanical filter. That is, exchange switch 36 selects a mechanical filters MCF-1 through MCF-N based on the optical transmission bit rate. FIG. 8 illustrates a state in which an output signal from window comparator 34 is filtered through mechanical filter MCF-1. Amplifier 37 amplifies the output signal of filter unit 35 and provides the amplified signal as a clock signal CLK OUT.

FIGS. 9A, 9B, 9C and 9D are diagrams illustrating waveforms produced by various connection components in timing extracting unit 27, according to an embodiment of the present invention.

More specifically, FIG. 9A is a diagram illustrating an output signal of main amplifier 26 and received by timing extracting unit 27.

FIG. 9B is a diagram illustrating the output of low-pass filter 31 of timing extracting unit 27. Referring now to FIG. 9B, the output signal of low-pass filter 31 is a waveform having leading and trailing edges which have been moderated by low-pass filter 31. The output signal of low-pass filter 31 is received by window comparator 34.

FIG. 9C is a diagram illustrating the output of window comparator 34. Referring now to FIG. 9C, window comparator 34 compares the output signal of low-pass filter 31 with thresholds Vthh and Vthl, and outputs a high signal "H" when the output signal of low-pass filter 31 is between thresholds Vthh and Vthl.

As illustrated in FIG. 9C, window comparator 34 generates a pulse have a predetermined pulse width in correspondence with the leading and trailing edges of the output signal of main amplifier 26. The output of window comparator 34 is input to a selected mechanical filter MCF-1 through MCF-N of filter unit 35 to generate a clock signal CLK OUT.

FIG. 9D is a diagram illustrating the output of filter unit 35. Referring now to FIG. 9D, filter unit 35 generates a waveform CLK OUT representing continuous clock signals. More specifically, since the selected mechanical filter of filter unit 35 has a mechanical resonant system, a resonant state is maintained even when output pulses of window comparator 34 are not continuously generated, thereby continuously generating clock signals.

The pulse width of each pulse produced by window comparator 34 depends on the moderating level at which the leading and trailing edges are moderated by low-pass filter 31. That is, the pulse width of pulses produced by window comparator 34 depends on the cut-off frequency of low-pass filter 31. Moreover, it is desirable for the duty of the pulse to be approximately 50% because an extremely small or large pulse duty prevents the selected mechanical filter of filter unit 35 from correctly oscillating.

A resistor 32 is used to control the frequency characteristics of timing extracting unit 27. Resistor 32 is, for example, a MOS-type transistor selected so that the pulse width of pluses produced by window comparator 34 are optimized for the optical transmission bit rate. The resistance value of resistor 32 is controlled by a voltage applied to resistor 32 by frequency-voltage conversion unit 13. The relationship between the voltage applied to resistor 32 by frequency-voltage conversion unit 13 and the resistance value of resistor 32 is illustrated in FIG. 6. Therefore, the cut-off frequency of low-pass filter 31 can be adjusted so that the pulse width (duty) of the output pulse of window comparator 34 is appropriate for the optical transmission bit rate. Thus, a mechanical filter can be correctly resonant for as an optional optical transmission bit rate at any time. That is, a clock component can be correctly extracted at an optional optical transmission bit rate.

Therefore, according to the above embodiments of the present invention, an optical receiving unit (for example, opto-electrical conversion unit 12) converts an optical signal into an electrical signal. The optical receiving unit includes a timing extracting unit 27 which includes a low-pass filter 31 having a cut-off frequency which is controllable in accordance with the frequency of a clock signal used to transmit data. Therefore, the cut-off frequency is a frequency characteristic of the optical receiving unit which is controllable in accordance with the frequency of the clock signal to control processing of the electrical signal.

Figure 10:
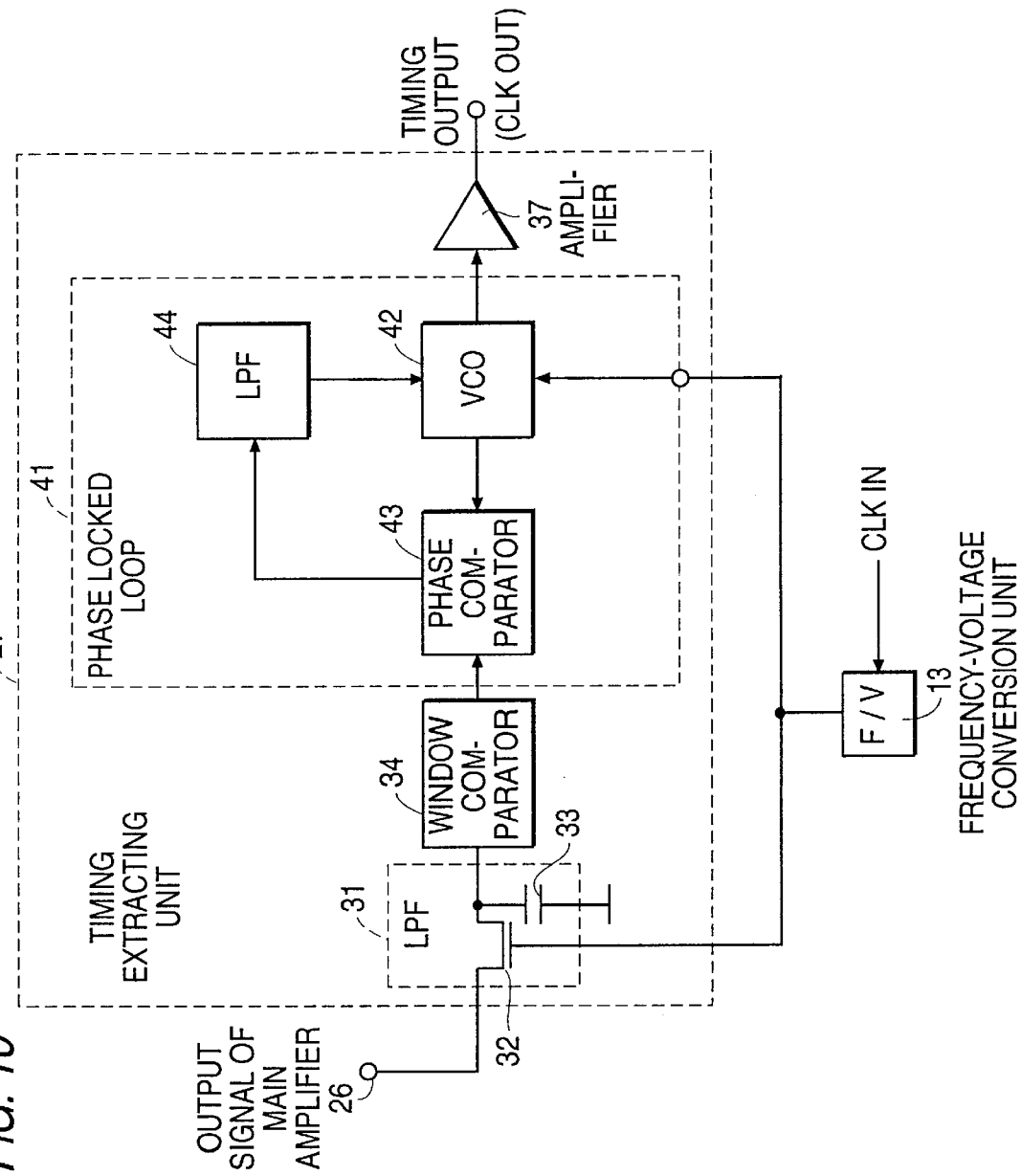
FIG. 10 is diagram illustrating a timing extracting unit of an optical transmitting and receiving module, according to an embodiment of the present invention.

FIG. 10 is diagram illustrating an additional embodiment of timing extracting unit 27 of optical transmitting and receiving module 10, according to an embodiment of the present invention. Referring now to FIG. 10, filter unit 35 and exchange switch 36 illustrated in FIG. 8 are replaced with a phase locked loop 41.

Phase locked loop 41 includes a voltage controlled oscillator (VCO) 42, a phase comparator 43, and a low-pass filter 44. Voltage controlled oscillator 42 outputs a clock signal according to the output voltage of frequency-voltage conversion unit 13. The frequency of the clock signal corresponds to an optical transmission bit rate. Phase comparator 43 compares the phase of the output signal from window comparator 34 with the phase of the clock signal generated by voltage controlled oscillator 42. The comparison result (phase difference information) obtained by phase comparator 43 is fed back to voltage controlled oscillator 42 through low-pass filter 44. Voltage controlled oscillator 42 adjusts the frequency of the clock signal generated by voltage controlled oscillator 42 according to the phase difference information so that the phases of the two signals match each other. The clock signal generated by voltage controlled oscillator 42 is amplified by amplifier 37 and output as a clock signal CLK OUT. Thus, the frequency of the clock signal produced by voltage controlled oscillator 42 is a frequency characteristic of opto-electrical conversion unit 12 which is controllable in accordance with the frequency of a clock signal used for transmitting data.

Timing extracting unit 27 illustrated in FIG. 10 generates a clock signal having a frequency of the optical transmission bit rate using the input clock signal CLK IN, and matches the phase of the clock signal with the phase of opto-electrical conversion unit 12. As a result, a clock signal synchronous with the received optical signal is generated. That is, a clock is retrieved from the received optical signal.

According to the above embodiments of the present invention, optical transmitting and receiving module 10 controls frequency characteristics of opto-electrical conversion unit 12, based on the bit rate of the input clock signal CLK IN used when the electro-optical conversion unit 11 transmits an optical signal. However, when an input clock signal is not provided to electro-optical conversion unit 11, a voltage source can be used to control feedback resistor 22, low-pass filter 23, and timing extracting unit 27.

Figure 11:
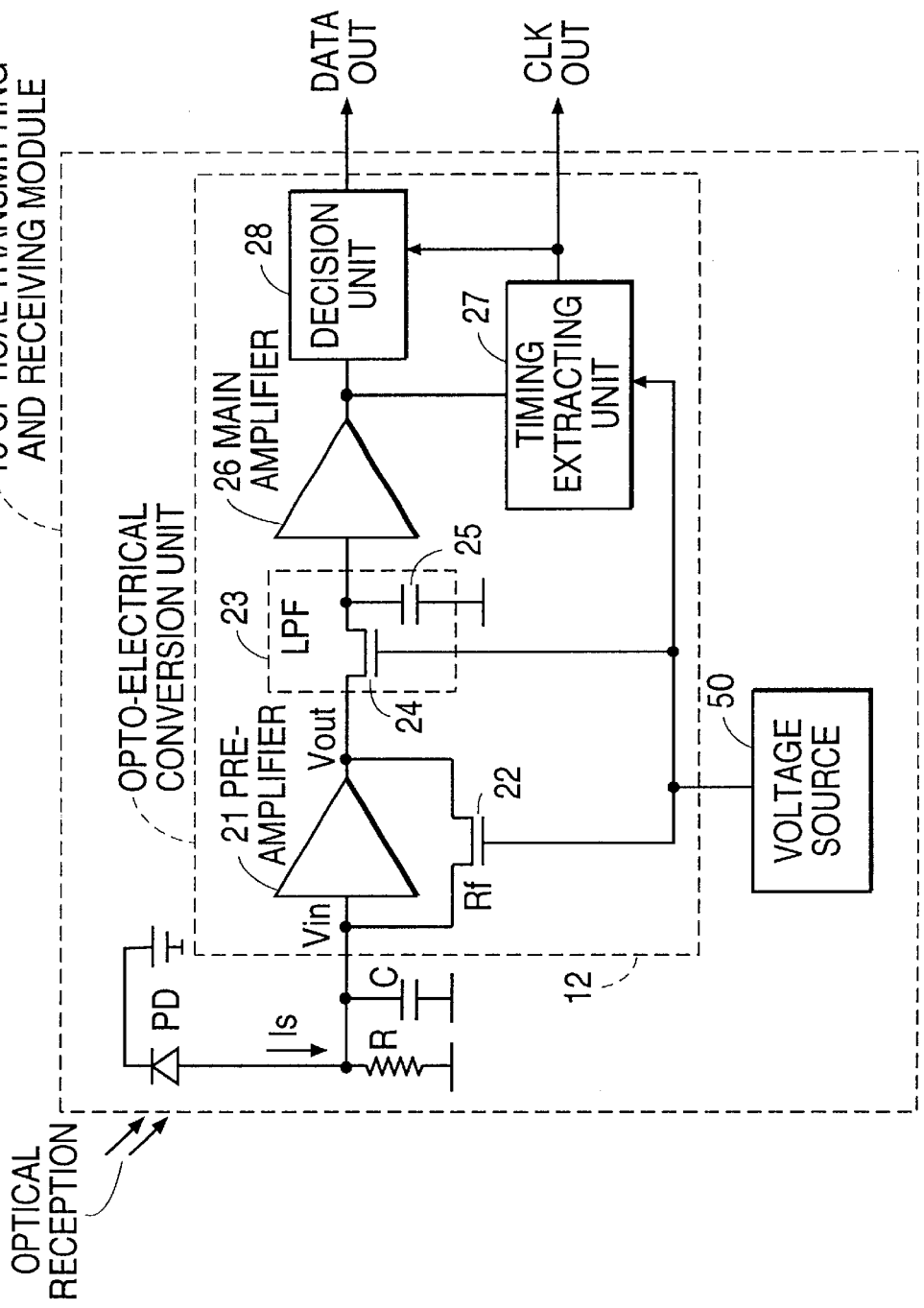
FIG. 11 is a diagram illustrating an optical transmitting and receiving module, according to an additional embodiment of the present invention.

For example, FIG. 11 is a diagram illustrating an optical transmitting and receiving module, according to an additional embodiment of the present invention. FIG. 11 is the same as FIG. 5, except that electro-optical conversion unit 11 and frequency-voltage conversion unit 13 are replaced with a voltage source 50. Voltage source 50 produces a voltage proportional to a bit rate at which optical signals are to be received by opto-electrical conversion unit 12. Feedback resistor 22, low-pass filter 23 and timing extracting unit 27 can then be controlled in accordance with the voltage produced by voltage source 50.

According to the above embodiments of the present invention, the resistance value of a resistor is controlled using an output voltage of frequency-voltage conversion unit 13. However, the present invention is not intended to be limited to controlling the resistance value of a resistor. For example, the frequency characteristics can be adjusted by controlling the capacitor of a low-pass filter using the output voltage of the frequency-voltage conversion unit 13. Moveover, the present invention is not intended to be limited to controlling the specific frequency characteristics described herein. For example, different frequency characteristics can be controlled in accordance with the optical transmission bit rate.

According to the above embodiments of the present invention, an optical transmitting and receiving module controls the frequency characteristics of an opto-electrical conversion unit according to the bit rate of a received optical signal, and therefore converts the optical signal into an electric signal under the optimum conditions in response to optical signals of various bit rates. Since the opto-electrical conversion unit detects the bit rate of the received optical signal based on clock signals generated independently of the received optical signal, stable frequency characteristics can be obtained without being affected by fluctuation in the level of a received optical signal, a mark rate, and a duty.

According to the above embodiments of the present invention, an optical transmitting unit converts an electric signal into an optical signal. An optical receiving unit converts a received optical signal into an electric signal. The frequency characteristics of the optical receiving unit are controlled based on the bit rate of a clock for use in transmitting data from the optical transmitting unit.

Moreover, according to the above embodiments of the present invention, when the bit rate of a transmission line is equal to that of a receiving line, the bit rate of the clock for use in transmitting data from the optical transmitting unit is equal to that of the received optical signal. Therefore, the frequency characteristics of the optical receiving unit can be controlled in accordance with a clock for use in transmitting data from the optical transmitting unit.

According to the above embodiments of the present invention, when the frequency characteristics components of an optical receiving unit are adjusted, the frequency characteristics of parts forming the components are controlled based on a clock signal for use in transmitting data from an optical transmitting unit. For example, when the band and gain of the amplifier, or the cut-off frequency of a filter, of an optical receiving unit are adjusted, the resistance of resistors forming the amplifier or filter are controlled based on the clock for use in transmitting data from the optical transmitting unit.

According to the above embodiments of the present invention, an apparatus transmits and receives optical signals, and is independent of the data transmission bit rate. The apparatus includes an optical transmitting unit and an optical receiving unit. The optical transmitting unit receives a clock signal and transmits an optical signal at a bit rate corresponding to the frequency of the clock signal. The optical receiving unit receives an optical signal, converts the received optical signal into an electrical signal and processes the electrical signal to be an electrical representation of the received optical signal. The optical receiving unit has frequency characteristics which are controllable in accordance with the frequency of the clock signal to control the processing of the electrical signal.

Moreover, according to the above embodiments of the present invention, an optical receiving unit receives an optical signal at a changeable bit rate. That is, the optical signal can be sent to the optical receiving unit at different bit rates. The optical receiving unit also receives a voltage corresponding to the bit rate of the received optical signal. For example, in FIG. 2, the voltage produced by frequency-voltage conversion unit 13 corresponds to the transmission bit rate. Since the transmission bit rate corresponds to the reception bit rate, the voltage produced by frequency-voltage conversion unit 13 corresponds to the reception bit rate. The optical receiving unit then converts the received optical signal into an electrical signal and processes the electrical signal to be an electrical representation of the received optical signal. The optical receiving unit has frequency characteristics which are controllable in accordance with the received voltage, to control the processing of the electrical signal.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus comprising:
   an optical transmitting unit which receives a clock signal and transmits an optical signal at a bit rate corresponding to the frequency of the clock signal; and
   an optical receiving unit which receives an optical signal, converts the received optical signal into an electrical signal and processes the electrical signal to be an electrical representation of the received optical signal, the optical receiving unit having frequency characteristics which are controllable in accordance with the frequency of the clock signal to control the processing of the electrical signal.

2. An apparatus as in claim 1, wherein the processing of the electrical signal includes amplifying the electrical signal, and the optical receiving unit comprises:
   an amplifying unit for amplifying the electrical signal, the amplifying unit having a gain and a band which are controllable in accordance with the frequency of the clock signal, and thereby being controllable frequency characteristics of the optical receiving unit.

3. An apparatus as in claim 2, further comprising:
   a frequency-voltage conversion unit which produces a voltage proportional to the frequency of the clock signal,
   wherein the amplifying unit of the optical receiving unit includes a feedback resistor having a resistance which is changeable in accordance with the voltage produced by the frequency-voltage conversion unit, for controlling the gain and band of the amplifying unit.

4. An apparatus as in claim 1, wherein the processing of the electrical signal includes filtering the electrical signal, the apparatus further comprising:
   a filter for filtering the electrical signal, the filter having a cut-off frequency which is controllable in accordance with the frequency of the clock signal, and thereby being a controllable frequency characteristic of the optical receiving unit.

5. An apparatus as in claim 4, further comprising:
   a frequency-voltage conversion unit which produces a voltage proportional to the frequency of the clock signal,
   wherein the filter is a low-pass filter and includes a resistor having a resistance which is changeable in accordance with the voltage produced by the frequency-voltage conversion unit, for controlling the cut-off frequency of the filter.

6. An apparatus as in claim 1, wherein the processing of the electrical signal includes extracting a timing signal from the electrical signal, and the optical receiving unit comprises:
   a timing extracting unit which extracts a timing signal from the electrical signal, the timing extracting unit including
   a low-pass filter receiving the electrical signal and producing a filtered output, the timing signal being determined from the filtered output, the low-pass filter having a cut-off frequency which is controllable in accordance with the frequency of the clock signal and thereby being a controllable frequency characteristic of the optical receiving unit.

7. An apparatus as in claim 6, further comprising:
   a frequency-voltage conversion unit which produces a voltage proportional to the frequency of the clock signal,
   wherein the low-pass filter includes a resistor having a resistance which is changeable in accordance with the voltage produced by the frequency-voltage conversion unit, for controlling the cut-off frequency of the filter.

8. An apparatus as in claim 6, wherein the timing extracting unit further comprises:
   a window comparator which compares the filtered output of the low-pass filter with threshold values and produces a corresponding output signal, and a clock extracting unit which produces a signal having a specific frequency from the output signal of the window comparator.

9. An apparatus as in claim 8, further comprising:
a frequency-voltage conversion unit which produces a voltage proportional to the frequency of the clock signal, wherein the clock extracting unit comprises
a plurality of filters which are individually selectable in accordance the voltage produced by the frequency-voltage conversion unit, each filter having have a different, corresponding resonant frequency, a selected filter receiving the output signal of the window comparator and producing a filtered signal having a frequency corresponding to the resonant frequency of the selected filter, the resonant frequencies of the plurality of filters thereby being controllable frequency characteristics of the optical receiving unit.

10. An apparatus as in claim 9, wherein each of the plurality of filters is a mechanical filter.

11. An apparatus as in claim 8, further comprising:
a frequency-voltage conversion unit which produces a voltage proportional to the frequency of the clock signal, wherein the clock extracting unit includes
a voltage controlled oscillator which produces a clock signal having a frequency determined in accordance with the voltage produced by the frequency-voltage conversion unit, and
a phase comparator which compares the phase of the output signal of the window comparator with the phase of the clock signal produced by the voltage controlled oscillator, and produces a corresponding comparative signal, wherein the voltage controlled oscillator receives the comparative signal and adjusts the frequency of the clock signal produced by the voltage controlled oscillator in accordance with the comparative signal, the frequency of the clock signal produced by the voltage controlled oscillator thereby being a controllable frequency characteristic of the optical receiving unit.

12. An apparatus as in claim 11, wherein the voltage controlled oscillator controls the frequency of the clock signal produced by the voltage controlled oscillator so that the phase of the output signal of the window comparator matches the phase of the clock signal produced by the voltage controlled oscillator.

13. An apparatus as in claim 1, further comprising:
a voltage source for producing a voltage proportional to a bit rate at which optical signals are to be received by the optical receiving circuit,
wherein, when the optical transmitting unit does not receive the clock signal, the optical receiving unit receives the voltage produced by the voltage source and controls the frequency characteristics in accordance with the received voltage to control the processing of the electrical signal.

14. An apparatus as in claim 2, further comprising:
a voltage source for producing a voltage proportional to a bit rate at which optical signals are to be received by the optical receiving circuit,
wherein, when the optical transmitting unit does not receive the clock signal, the optical receiving unit receives the voltage produced by the voltage source and controls the frequency characteristics in accordance with the received voltage to control the processing of the electrical signal.

15. An apparatus as in claim 4, further comprising:
a voltage source for producing a voltage proportional to a bit rate at which optical signals are to be received by the optical receiving circuit,
wherein, when the optical transmitting unit does not receive the clock signal, the optical receiving unit receives the voltage produced by the voltage source and controls the frequency characteristics in accordance with the received voltage to control the processing of the electrical signal.

16. An apparatus, comprising:
an optical receiving unit receiving an optical signal, converting the received optical signal into an electrical signal and processing the electrical signal to be an electrical representation of the received optical signal, the optical receiving unit having frequency characteristics which are controllable in accordance with the frequency of a clock signal to control the processing of the electrical signal, the clock signal used by an optical transmitting unit which transmits an optical signal at a bit rate corresponding to the frequency of the clock signal.

17. An apparatus as in claim 16, wherein the processing of the electrical signal includes amplifying the electrical signal, and the optical receiving unit comprises:
an amplifying unit for amplifying the electrical signal, the amplifying unit having a gain and a band which are controllable in accordance with the frequency of the clock signal, and thereby being controllable frequency characteristics of the optical receiving unit.

18. An apparatus as in claim 16, wherein the processing of the electrical signal includes filtering the electrical signal, and the optical receiving unit comprises:
a filter for filtering the electrical signal, the filter having a cut-off frequency which is controllable in accordance with the frequency of the clock signal, and thereby being a controllable frequency characteristic of the optical receiving unit.

19. An apparatus as in claim 16, wherein the processing of the electrical signal includes extracting a timing signal from the electrical signal, and the optical receiving unit comprises:
a timing extracting unit which extracts a timing signal from the electrical signal, the timing extracting unit including
a low-pass filter receiving the electrical signal and producing a filtered output, the timing signal being determined from the filtered output, the low-pass filter having a cut-off frequency which is controllable in accordance with the frequency of the clock signal and thereby being a controllable frequency characteristic of the optical receiving unit.

20. An apparatus comprising:
an optical transmitting unit which receives a clock signal and transmits an optical signal at a bit rate corresponding to the frequency of the clock signal; and
an optical receiving unit comprising
an opto-electrical conversion unit which converts an optical signal into an electrical signal,
an amplifying unit which amplifies the electrical signal, the amplifying unit having a gain and a band which are controllable in accordance with the frequency of the clock signal, and a filter which filters the amplified electrical signal, the filter having a cut-off frequency which is controllable in accordance with the frequency of the clock signal.

21. An apparatus comprising:

an optical receiving unit receiving an optical signal at a changeable bit rate and a voltage corresponding to the bit rate, converting the received optical signal into an electrical signal and processing the electrical signal to be an electrical representation of the received optical signal, the optical receiving unit having frequency characteristics which are controllable in accordance with the received voltage to control the processing of the electrical signal.

22. An apparatus as in claim 21, wherein the processing of the electrical signal includes amplifying the electrical signal, and the optical receiving unit comprises:

an amplifying unit for amplifying the electrical signal, the amplifying unit having a gain and a band which are controllable in accordance with the received voltage, and thereby being controllable frequency characteristics of the optical receiving unit.

23. An apparatus as in claim 21, wherein the processing of the electrical signal includes filtering the electrical signal, and the optical receiving unit comprises:

a filter for filtering the electrical signal, the filter having a cut-off frequency which is controllable in accordance with the received voltage, and thereby being a controllable frequency characteristic of the optical receiving unit.

24. An apparatus as in claim 21, wherein the processing of the electrical signal includes extracting a timing signal from the electrical signal, and the optical receiving unit comprises:

a timing extracting unit which extracts a timing signal from the electrical signal, the timing extracting unit including a low-pass filter receiving the electrical signal and producing a filtered output, the timing signal being determined from the filtered output, the low-pass filter having a cut-off frequency which is controllable in accordance with the received voltage and thereby being a controllable frequency characteristic of the optical receiving unit.

* * * * *